United States Patent [19]

Dahlin et al.

[11] Patent Number: 5,420,864
[45] Date of Patent: May 30, 1995

[54] METHOD OF EFFECTING RANDOM ACCESS IN A MOBILE RADIO SYSTEM

[75] Inventors: Steinar Dahlin, Järfälla; Walter Müller, Kista, both of Sweden

[73] Assignee: Telefonaktiebolaget LM Ericsson, Stockholm, Sweden

[21] Appl. No.: 140,467

[22] Filed: Oct. 25, 1993

[30] Foreign Application Priority Data

Oct. 26, 1992 [SE] Sweden ................................. 9203127

[51] Int. Cl.$^6$ ............................................. H04J 3/16
[52] U.S. Cl. ................................................. 370/95.3
[58] Field of Search ................ 370/95.1, 95.2, 95.3, 370/85.2, 85.8, 85.7, 85.6; 340/825.08; 371/204

[56] References Cited

U.S. PATENT DOCUMENTS

| | | | |
|---|---|---|---|
| 4,612,637 | 9/1986 | Davis et al. | 379/95.1 |
| 4,742,512 | 5/1988 | Akashi et al. | 370/95.3 |
| 4,783,780 | 11/1988 | Alexis | 370/60.1 |
| 4,809,268 | 2/1989 | Tejima et al. | 370/93.1 |
| 4,833,702 | 5/1989 | Shitara et al. | 370/60 |
| 4,940,974 | 7/1990 | Sojku | 370/95.2 |
| 5,161,154 | 11/1992 | Diat et al. | 370/95.1 |
| 5,166,929 | 11/1992 | Lo | 370/85.3 |

FOREIGN PATENT DOCUMENTS

| | | |
|---|---|---|
| 0321454 | 6/1989 | European Pat. Off. . |
| 0336079 | 10/1989 | European Pat. Off. . |
| 0370826 | 5/1990 | European Pat. Off. . |
| 0462572 | 12/1991 | European Pat. Off. . |
| 2063011 | 5/1981 | United Kingdom . |

OTHER PUBLICATIONS

Patent Abstract of Japan, vol. 9, nr. 318, JP 60-152144 (Dec. 13, 1985).

Patent Abstract of Japan, vol. 10, nr. 113, JP 60-248039 (Apr. 26, 1986).

North American Standard EIA/TIA IS-54B, "Digital Traffic Channel Structure", Section 1.2, p. 9 (Apr. 1992).

A. Murase et al., "Idle-Signal Casting Multiple Access with Data Slot Reservation (ICMA-DR) for Packet Radio Communications" IEEE Trans. on Vehicular Technology, vol. 38, No. 2, pp. 50-54 (May 1989).

*Primary Examiner*—Douglas W. Olms
*Assistant Examiner*—Patel Ajit
*Attorney, Agent, or Firm*—Burns, Doane, Swecker & Mathis

[57] ABSTRACT

A method for random access in a time divided mobile radio system, for instance an FDMA/TDMA system, which includes digital traffic channels and control channels which are organized so that four traffic channels and two control channels are included in a TDMA-frame. A base station transmits continually flags in the time slots of the control channels. A mobile station desiring access to the system responds by sending a first message word (W1) in the time slot indicated by the base station in a first flag. When the mobile station wishes to transmit several message words, the base station reserves one or more time slots to this end by transmitting the first flag, although this flag now states that these time slots are busy for other mobile stations. Furthermore, the base station transmits a flag (R/N) which states whether or not a message word has been received from the mobile station. The base station can transmit a further flag, which denotes that a given time slot has been reserved for a given mobile station from the very beginning of an access procedure and cannot therefore be used by any other mobile station.

7 Claims, 5 Drawing Sheets

METHOD OF EFFECTING RANDOM ACCESS IN A MOBILE RADIO SYSTEM

BACKGROUND

The present invention relates to a method of effecting random access in a time divided mobile radio system having a primary station and a plurality of secondary stations belonging to the primary station. More specifically, the invention relates to a method of access to these secondary stations when they are in an idle mode, i.e. when the stations listen to messages from the primary station within a given geographical area (cell) and when they wish to establish some form of communication with the primary station. The mobile radio system is a time divided system (TDMA or CDMA) or a combined frequency and time divided system (FDMA/TDMA) with so-called digital control channels, which are utilized by the inventive method.

Random access in a mobile radio system, for instance a mobile telephone system, is known both for analog and digital systems. Random access implies generally that a secondary station (mobile station) transmits to a primary station randomly in time an initial message in accordance with a given protocol, requesting access to the primary station. The primary station then responds, by sending a flag to the secondary station for continued communication between the primary and the secondary stations. The access protocol used in TDMA-systems, so-called time divided or slotted Aloha, is described, for instance, in EP-A-0,321,454.

An access method with time divided Aloha is described, for instance, in the U.S. Pat. No. 5,166,929 (Wing Lo). According to this known method, access is effected by a mobile station by sending to a base station reservation messages which denote which time slot and how many such time slots shall be reserved by the base station for the mobile station concerned, in order to enable the mobile station to complete its access message, so called "Reservation Aloha". This known method can be used particularly in a digital control channel and the access messages can be sent in those free spaces that are created in such a channel when certain control information (SACCH, DVCC) normally used in a traffic channel is not used.

SUMMARY

The known access method according to the aforesaid U.S. patent deals with the problem of how a mobile station can communicate with a base station by requesting for certain time slots and a certain number of time slots to be reserved for the continued access message. In this regard, the base station uses a flag marked "reserved" and "idle", respectively, where "reserved" thus marks in the base station those time slots of the continuously transmitted time slots that have been reserved for a certain mobile or for several mobiles desiring access to the system. It is assumed that the continued communication is effected without undue hinder to or error in the messages transmitted to the base station.

The present method is also based on the known access method for continued communication after having reserved time slots for a mobile station. According to one embodiment of the method, a further flag is inserted in the base station, "received", "not received", abbreviated to R/N, which discloses whether or not the message word transmitted to the base station from the mobile station within a given time slot has actually been received by the base station. If the message word has not been received, the base station asks the mobile to transmit solely the latest word. When the word concerned was one of the last words in the message, a significant simplification is achieved in comparison with the case when it is necessary to transmit the whole message again, as is normal when errors in transmission occur.

According to a further embodiment of the invention, there is introduced a third flag which is additional to the aforesaid two flags This third flag, "reserved, free", R/F, is sent from the base station, as with other flags, and discloses to the mobile the time slot in which the mobile shall transmit a response to the request transmitted from the base station and in which the information concerning the reserved time slot was found.

One object of the present invention is to provide a method of achieving random access in a time divided (TDMA) mobile radio system which will ensure that, even after the secondary station desiring access to the primary station has been allotted one or more message time slots, a message will be completely transmitted to a base station without unnecessary repetition of message words that have been correctly received.

Another object of the present invention is to allocate, upon access to a mobile radio system, a free time slot to a mobile station from a base station in conjunction with transmitting access messages which require simple confirmation from the mobile station in the form of a message word.

A further object of the present invention is to establish three different flags in a base station which receives messages from mobile stations for access to the base station, of which flags two are used to allocate more than one time slot for the message from the mobile station and to ensure that this message is received correctly in the base station, and one is used to reserve beforehand one time slot for an access message from a given mobile station.

BRIEF DESCRIPTION OF THE DRAWINGS

The invention will now be described in more detail with reference to the accompanying drawings, in which.

DETAILED DESCRIPTION

Figure 1:
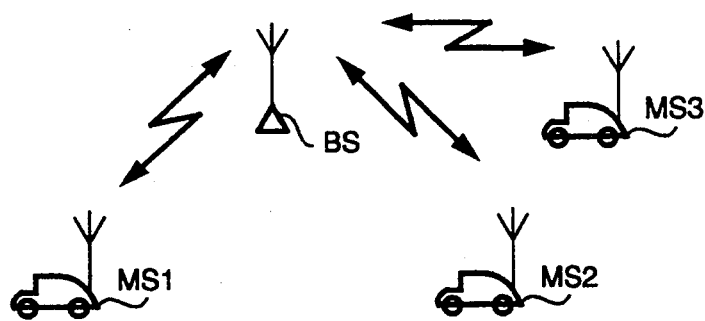
FIG. 1 illustrates schematically a primary station and three secondary stations of a mobile radio system.

FIG. 1 illustrates generally a primary station and a number of secondary stations in a mobile radio system, which may be an analog or a digital system and possibly also a cellular system. The primary station is a base station BS and the secondary stations are mobile stations MS1, MS2, MS3. The inventive method is intended for application in a time divided mobile radio system, preferably a cellular system which includes so-called digital control channels. In present-day North American systems, control channels are analog channels, i.e. check and control messages are transmitted over analog channels, even when the traffic channels are digital. In future systems, however, such messages, for instance authentication checks, will also be transmitted over digital control channels.

In the simplified digital system with digital control channels shown in FIG. 1, it is assumed that each of the mobiles MS1–MS3 is in its idle mode. The base station BS continuously transmits messages with so-called flags in the forward direction over a control channel DFOCC, although in given time slots, these flags indicating whether the time slot in which the message is sent is idle or busy. A mobile station MS1 is able to receive such messages in certain time slots and transmits back to the base station in another control channel DRECC in the reverse direction, so that the message can be received by the base station BS. This enables the mobile stations to obtain random access to the system.

Figure 2:
FIG. 2 illustrates a time slot format for an uplink digital control channel in a time divided (TDMA) mobile radio system.
Figure 3:
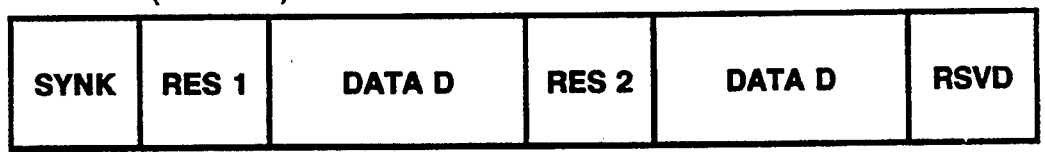
FIG. 3 illustrates a time slot format for a downlink digital control channel in a time divided (TDMA) mobile radio system.

The time slot format shown in FIGS. 2 and 3 has been proposed, with the intention of creating the two control channels DFOCC and DRECC in the forward and reverse direction respectively. Compared with the digital traffic channel as proposed in the North American Standard EIA/TIA IS-54B, April 1992 (page 9, 1,2 "Digital Traffic Channel Structure"), the reverse control channel DRECC has a reserved space RES and the forward control channel DFOCC has a divided reserved space RES1, RES2. The spaces are used for the information bits which are included in those flags that are transmitted from the base station in respective control channels, as described in more detail below. Messages (without flags) are transmitted from a mobile station in the data fields Data D.

Figure 4:
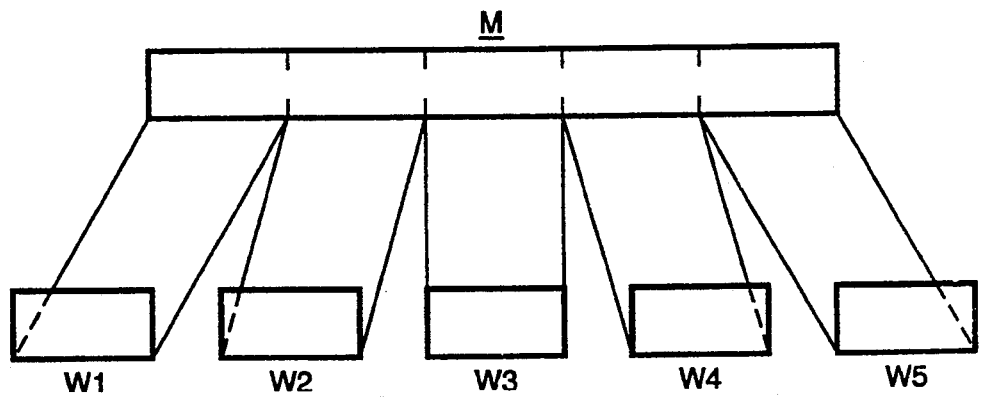
FIG. 4 illustrates a message sent from a secondary station according to FIG. 1 and divided into message words.

FIG. 4 illustrates a message word M, for instance a message from a mobile station MS1 to the base station BS concerning a reply to an authorization query from the base station BS. The message is divided into a number of words, in the present example five words W1, W2, ... W5, each of which is intended to be sent as a burst within a given time slot. The message need not be a "straight" message, in the meaning that the information is transmitted as a continuous message in time, but may be interleaved with several message words or with several messages. This procedure is known per se and has no decisive significance to the principle of the present invention. The division of a message according to FIG. 4 is called segmentation and each message word W1–W5 is channel-coded in a known manner and formatted so as to enable it to be transmitted as a burst in a time slot.

Figure 5:
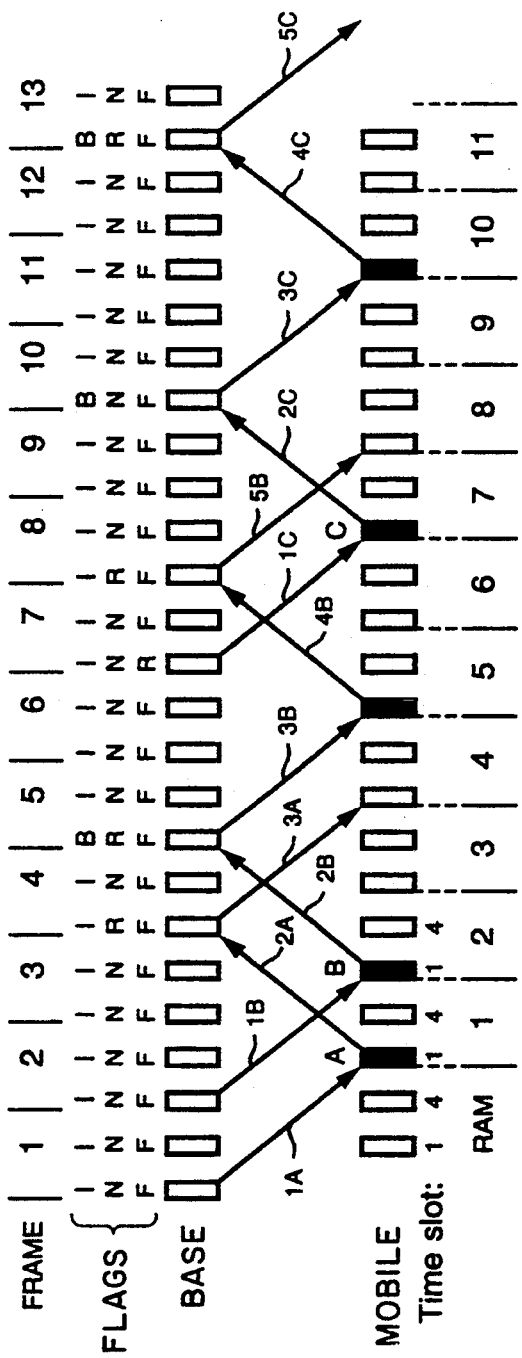
FIG. 5 is a diagram which illustrates the inventive method in respect of a message according to FIG. 4.

FIG. 5 is a diagram which illustrates transmission over the two channels DFOCC and DRECC in relation to the two time slots within each frame that the control channels have at their disposal. As is known, a TDMA-frame in the North American mobile radio system is comprised of six time slots, of which the time slots 1 and 4 are reserved for the control channels and the remaining four time slots are reserved for the traffic channels. The time slots of the control channels are the time slots shown in FIG. 5 and referenced 1 and 4. Not all of the time slots of all traffic channels have been shown in FIG. 5. The upper row of time slots are those which are at the disposal of flags and message words that shall be received by a mobile station MS1–MS3, while the bottom row of time slots are those in which a mobile station transmits message words to the base station.

The base station initially transmits the messages continuously in the control channel time slots (1 and 4). A mobile station MS1 which desires access to the system can seize a message word from the base station BS, which therewith informs that the mobile station can transmit back to the base station in a given free time slot. In the "Aloha Reservation" method, the mobile station MS1 responds by asking the base station to reserve a given number of time slots, so that the message from the mobile can be received by the base station. In response, the base station sends a flag B/I("busy/idle"), which indicates that the time slots requested by a given mobile have now been reserved for said mobile MS1 and are thus busy to other mobiles MS2, MS3. This applies in those instances when a message has several words and several time slots are therewith required to transmit the message.

It is obvious that this method is not sufficiently reliable to ensure that a message can be transmitted to the base station with certainty. For instance, the base station must be able to establish that the message word has been transmitted correctly, and if this is not the case to ask for the word to be retransmitted. Consequently, according to the present method, the number of flags sent by the base station BS is extended in accordance with the following:

One flag R/N ("received/not received"), where "R" denotes that the message word is considered to have been received correctly, for instance by carrying out a so-called CRC ("cyclic redundancy check") on the word received, and where "N" thus denotes that the base station does not consider the word to have been received correctly, and a flag R/F ("reserved/free"), where R denotes that a time slot in DRECC, i.e. for transmission by the mobile to the base station is reserved by the base station for this particular mobile, so that the mobile can sent its reply to the base station. Normally, the message in DFOCC from the base station will include a request for the mobile to transmit, e.g., an acknowledgement, and the message will therefore contain information relating to the time slot that has been reserved for this particular mobile. For instance, the DFOCC-message will contain information as to how many time slots the mobile can expect from a given reference timepoint to the reserved time slot. "F" indicates that no time slot has been reserved for the mobile and that the time slot which, e.g., should have been reserved for the mobile MS1 is instead now free for other mobiles MS2, MS3.

The two additional flags need not be used simultaneously. The flags R/N and R/F are independent of one another and in some instances it is sufficient to use only the flags B/I and R/N.

All flags are set in the base station from the beginning, when no message exchange has yet taken place.

B/I is set to I ("idling");
R/N is set to N ("not received"); and
R/F is set to F ("free").

The inventive method will now be illustrated with reference to three examples, see FIG. 5. A common feature of the following examples A and B is that the base station BS sends the flags I, N, F to all mobile stations MS1–MS3 and that these flags are received by the mobile stations MS1, MS2 in accordance with examples A and B respectively.

Thus, it is assumed in the first example A that the mobile MS1 has captured the flags I, N, F and seeks access to the system through one single message word W1, which shall be sent by MS1 to the system via the base station BS, in the time slot 1, frame 1, allotted by the base station. The mobile station MS1 transmits (arrow 2A) and the base station BS detects the sync. word (SYNC, FIG. 2) in DRECC, decodes the message word and carries out a CRC-check. No flags in the time slots are changed if CRC found the received message word to be incorrect, i.e. the flags are maintained as I, N and F, as shown in FIG. 5. If CRC found the received message word to be correct, which is the case according to this example, the receiving flag is set to R. In this case, the message is comprised of only one message word to the base station BS, which sends the flags I, R, F back to the mobile station MS1 (arrow 3A). This station receives the flags I, R, F and therewith observes that the message word W1, i.e. the whole of the message in this particular case, has been received correctly by the system and that access has thus been successful.

In the other example B, it is assumed that the mobile station MS2 seeks access to the system (the base station BS), the access message M consisting of two message words W1 and W2 which are received correctly by the base station BS. No particular time slot has yet been reserved for MS 2 and the base station BS sends the flags I, N, F to all mobile stations, although it is assumed that time slot 1 in frame 2 is picked-up by MS2 (arrow 1B).

When the mobile station MS2 sends its first message word W1 (arrow 2B), it indicates to the base station BS at the same time that it intends to transmit two message words W1, W2. Consequently, the base station BS indicates in its message (arrow 3B) that the time slot 1 in frame 5 has been marked as busy "B". This word is received correctly by the base station BS, which sends the flags "B" and "R" over DFOCC, which are received by MS2 (arrow 3B). The mobile station MS2 now sends the other message word W2 over DRECC (arrow 4B), and this word is also received correctly by the base station BS. Consequently, the base station BS transmits the flags "I" and "R" (arrow 5B), where; "I" thus indicates that the next time slot (time slot 1, frame 8) which should have been busy "B" is now free to other mobile stations MS1, MS3, since no further message words are expected from the mobile station MS2.

In the two examples A and B described above, the different mobiles compete between themselves to obtain a free time slot when the base station BS transmits its flags I, N, F (arrows 1A, 1B), so as to be able to send the first message word to the base station BS. The first to do this is the winner. However, the system (the base station) is able to allocate a reserved time slot to a given mobile MS3 prior to transmitting the flags, so that this mobile does not need to compete with the other mobiles MS1, MS2. In this regard, the base station transmits the flags I, N, R, where "R" thus denotes that a time slot in a given frame has been reserved and is therefore unaccessible to other mobile stations, in this example the mobile stations MS1, MS2.

It is assumed in the third example C that the mobile MS3 begins to transmit a message M in a time slot that has already been reserved, this message consisting of two message words W1 and W2. It is assumed that one of these message words is received wrongly by the base station, due to the word being distorted (because of fading, for instance) during transmission. It is also assumed that the system has earlier reserved a time slot for the mobile station MS3. This time slot may have been reserved in conjunction with an earlier access to the mobile station MS3, according to example A above. The last message from the base station BS (arrow 3A) contained information relating to the position of the reserved time slot, calculated in number (22) of half-frames, each of 20 ms from, for instance, the time-point of the first message (arrow 2A) from the mobile MS3.

The base station will transmit its response with the flags I, N, R (arrow 1C) in accordance with the aforegoing, and the mobile MS3 will transmit its first message word W1 (arrow 2C) upon receiving the flags. The base station BS receives and checks whether or not more message words are to be transmitted. Since this is the case, the flags B, N, F are sent to the mobile MS3. However, the base station BS has not detected the message word W1 correctly, and hence the base station sends "B" and "N", where "N" denotes that the message word last received has not been received correctly and should therefore be sent again. The base station therefore sends (arrow 3C) the aforesaid flags "B" and "N" and also asks MS3 to transmit the latest message word W1 again. The mobile MS3 receives this message and notes that the word W1 shall be transmitted again, and complies with this request, arrow 4C. It is assumed that retransmission of the word is successful and that BS receives the word W1 correctly.

The different procedures undertaken in a mobile station in conjunction with the aforedescribed exchange of messages will be described in more detail with reference to the flow charts illustrated in FIGS. 7 and 8. However, the Carnaugh diagram shown in these Figures will be explained in more detail first, see FIG. 6.

Figure 6:
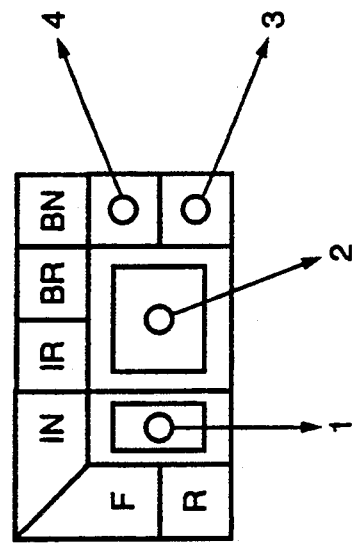
FIG. 6 is a decoding diagram which illustrates flags used in accordance with the inventive method.

In the Carnaugh diagram of FIG. 6, all flag combinations from the first, second and third rows have been combined in four columns, so that the first column states the case IN "idle" and "not received"; the second column states the case IR "idle" and "received"; the third column states the case BR "busy" and "received"; and the fourth column states the case BN "busy" and "not received" for the two possibilities F "free" and R "reserved" of the third flag.

The Carnaugh diagram shown in FIG. 6 discloses how a state given by the burst in a given time slot 1 or 4 according to FIG. 5 shall be interpreted by a mobile station MS1–MS3 when this station receives the burst in the time slot from the base station in the forward control channel DFOCC.

Four possible outcomes are found in the Carnaugh diagram, illustrated by the references 1–4. For one of these outcomes, certain conditions shall be fulfilled as indicated by the rectangular blocks in the diagram.

The outcome 1 applies to the two flags: That the received word denotes that the time slot is idle and that the word from a mobile station has not been received correctly and that the time slot is either free or reserved.

The outcome 2 applies to four cases: That the time slot is idle at the same time as words have been received for the two possibilities free or reserved time slot, or the time slot is occupied for the same two possibilities.

The outcome 3 applies to only one case: That the time slot is busy and the message word has not been received correctly at the same time as the time slot is reserved.

The outcome 4 also applies to only one case, similar to outcome 3, although in this case the time slot is free.

Figure 7:
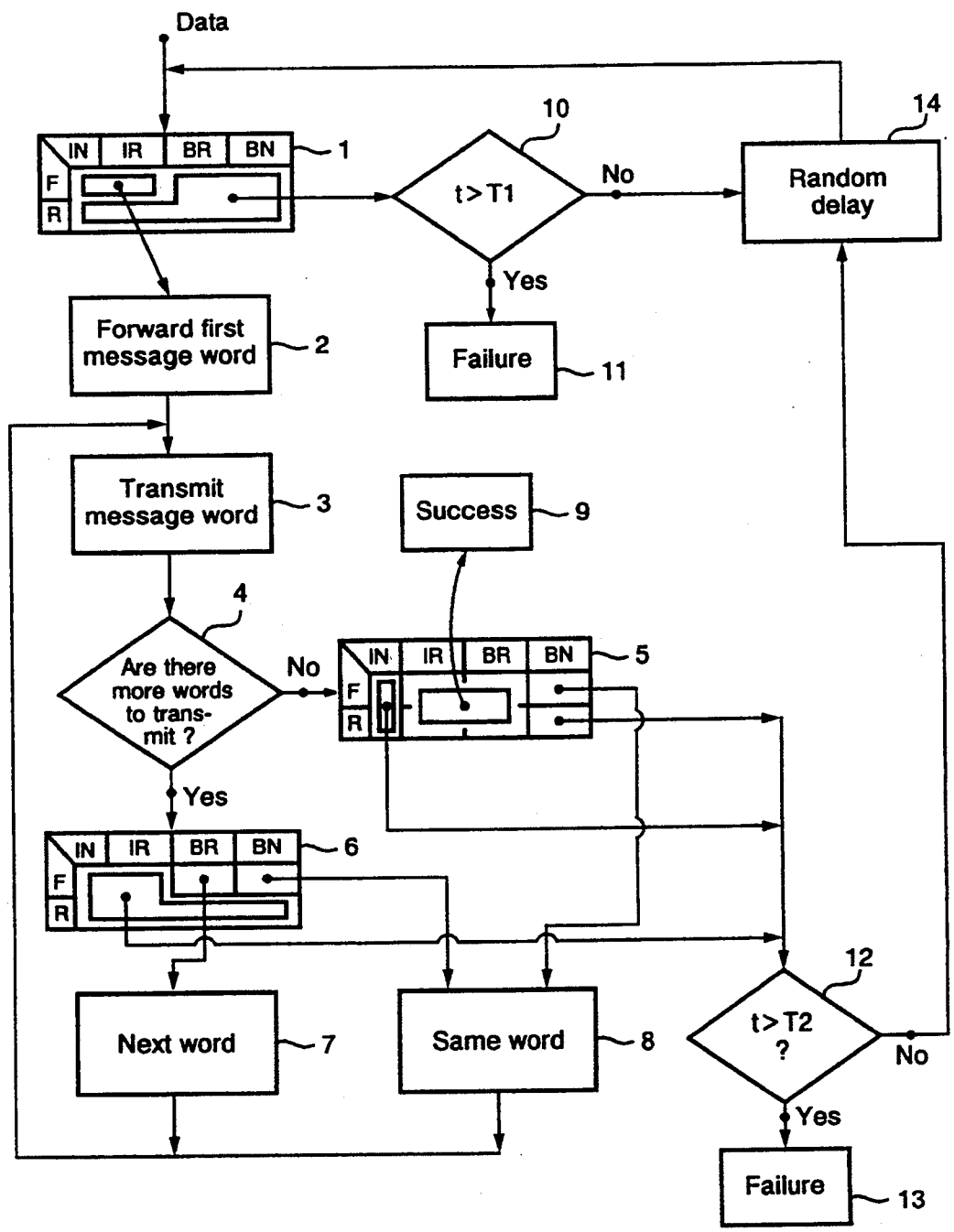
FIG. 7 is a flow chart illustrating two examples of the inventive method.
Figure 8:
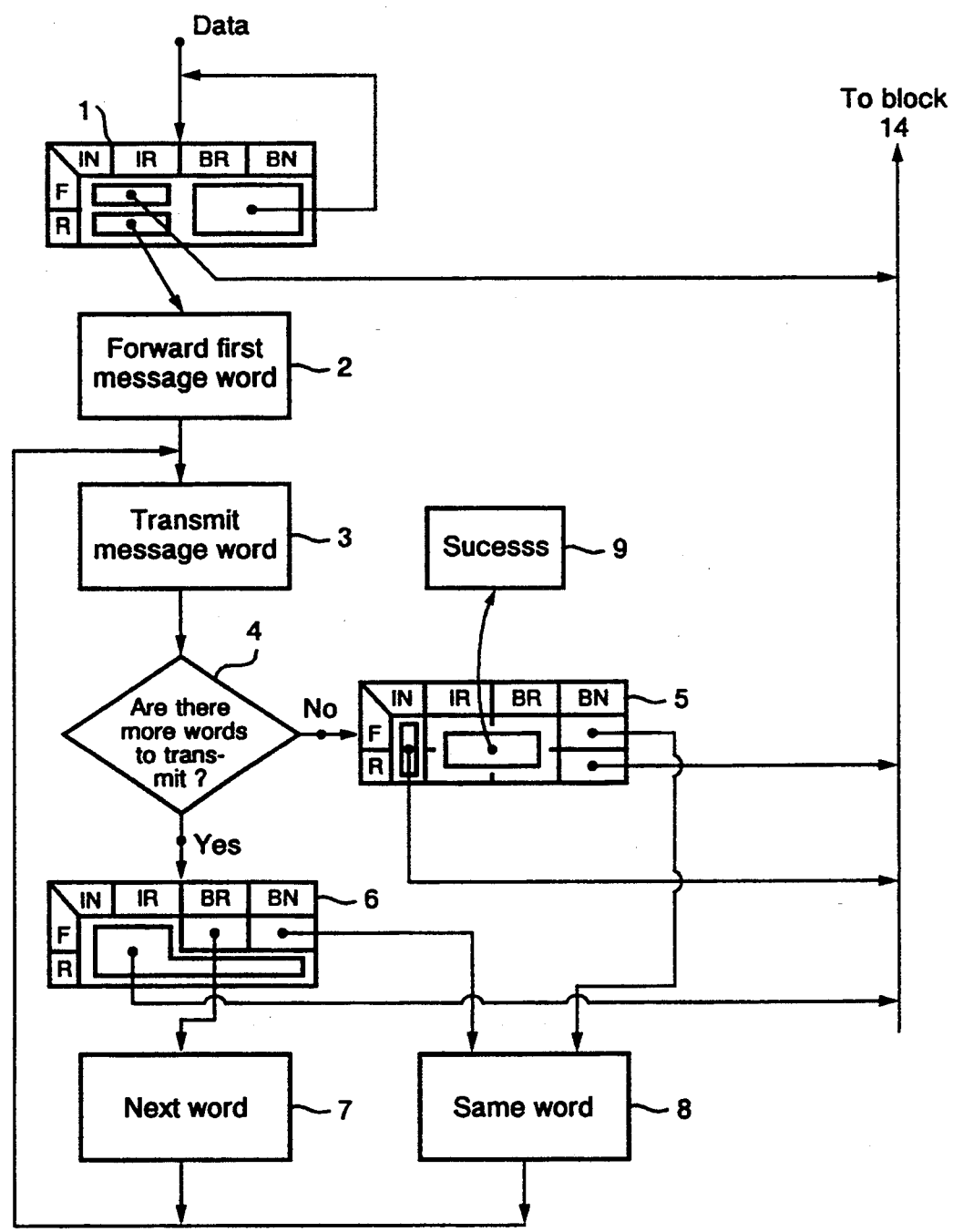
FIG. 8 is a flow chart illustrating a third example of the inventive method.

There is included a Carnaugh diagram in each of the flow charts shown in FIGS. 7 and 8, so that the various steps carried out in a mobile station can be explained. Each Carnaugh diagram shows the state and those outcomes that are obtained on a given occasion (instant), depending on which flag has been received from the base station and corresponding to the various arrows 1A, 2A, . . . ; 1B, 2B, . . . , according to FIG. 5.

FIG. 7 is a mobile station flow chart which is intended to illustrate the two aforesaid examples A and B.

The decoding diagram 1 in FIGS. 7 and 8 gives a certain outcome which will depend on the flags of the first message from the base station BS, while the diagrams 5 and 6 will give certain outcomes which will depend on the flags of the second and subsequent messages.

According to example A, mobile station MS1 wishes to send a simple message to the base station BS. The incoming first message including the flags I, N, F is decoded in accordance with diagram 1 and gives the outcome 1 (FIG. 7). The mobile station therefore brings forward the first message word W1 (in this case, the only word to be sent) according to block 2 (FIG. 7), and transmits this word, block 3. Subsequent to having transmitted the word W1, a query is raised, block 4, as to whether more than one word shall be transmitted. Since this is not the case, the answer "No" is obtained from block 4. The base station BS has sent the message including the flags I, R, F to MS1 and has received the first word W1 (arrow 3A, FIG. 5), whereby the diagram 5 for the second message sends the outcome to block 9, disclosing that the transmission was "successful".

In the case of the other example B, the message is comprised of two words W1, W2 from the mobile station MS2, it being assumed that these two words have been received correctly by the base station BS.

The mobile station MS2 receives the flags I, N, F from the base station BS (arrow 1B, FIG. 5), similar to example A, and brings forward the first message word W1 in accordance with block 2, pointed out by the outcome from diagram 1. A check is then made to ascertain whether or not more words shall be transmitted, block 3 and 4. Since this is the case, the answer "Yes" is obtained, which means that the diagram 6 shall apply to the flags in the next message incoming from the base station BS. Since the message includes the flags B, R, F (arrow 3B), an outcome indicating block 7 is obtained, this block stating that the next word can be brought forward in the mobile station MS2. According to the loop, the next step is a return to block 3 and the second word W2 is transmitted to the base station BS (arrow 4B, FIG. 5). Since no more words are to be transmitted according to question block 4, the next message from the base station BS (arrow 5B) is decoded in accordance with diagram 5. This message includes the flags I, R, F and the transmission is therefore considered to be "successful" block 9.

FIG. 8 is a flow chart for the example C, i.e. in which a time slot has been reserved in advance for the mobile station MS3 and the base station shall thus send the flags I, N, R (arrow 1C, FIG. 5). If the correct flags I, N, R are sent, an outcome is obtained indicating block 2 and the mobile station will bring forward the first message word W1. If the continued communication shows that the base station receives correctly, the steps are executed in the same way as that described with reference to examples A and B. On the other hand, if the base station BS has not understood or correctly received the transmitted word W1 (arrow 2C), the base station will send the flags B, N, F (arrow 3C), where "N" denotes incorrect reception, as described above. On this occasion, it is the diagram 5 that determines which outcome shall be given, and this outcome points to block 8 which means that the same word, i.e. W1, shall be fed back to block 3, i.e. the word W1 shall be retransmitted. On the next occasion, when a message from the base station arrives (arrow 5C), it is the diagram 6 which determines what outcome is given. If, as in the present case, a further word W2 is to be sent and the flags I, R, F arrive, the diagram 6 indicates an outcome to block 7 to be given and that the further word W2 is transmitted. If this word is received correctly by the base station, the flags I, R, F are sent, since the word W2 was the last word. If the word W2 had not been the last word and a further word W3 should have been sent from the mobile station MS3, the base station would have sent B, R, F and the steps according to example B would have been carried out.

Figure 9:
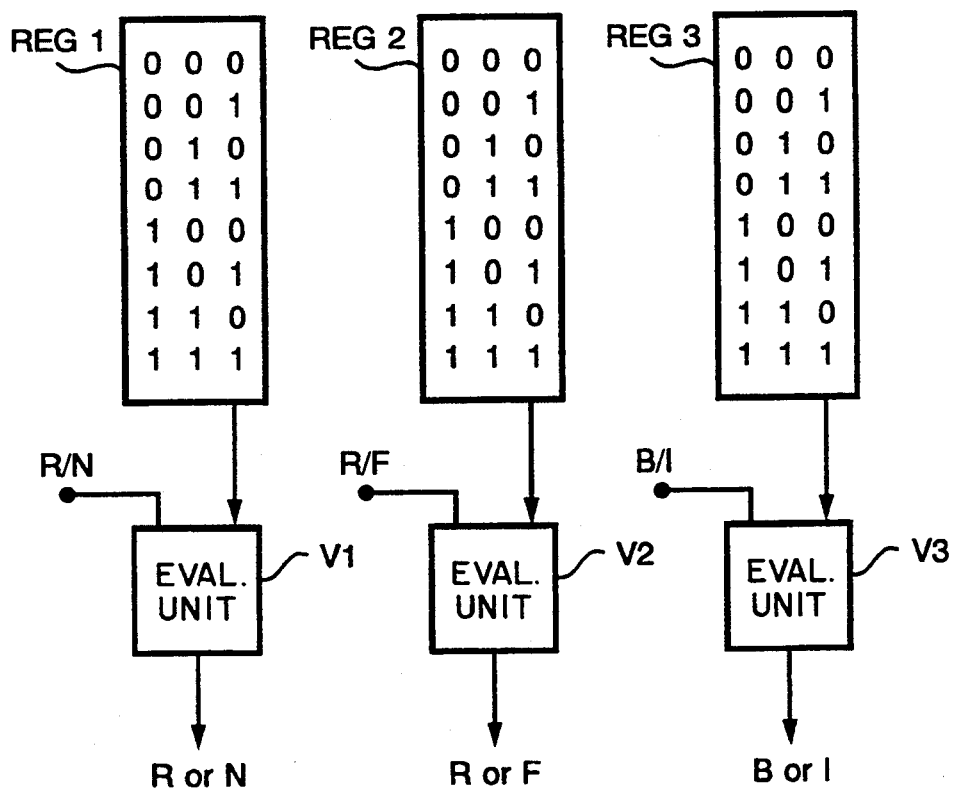
FIG. 9 is a block diagram illustrating that part of a mobile station which evaluates the flags illustrated in FIG. 6.

The different flags are transmitted as binary values in a known manner from the base station to respective mobile stations in the forward control channel DFOCC according to FIG. 3, and in the spaces RES1, RES2 and possibly also in the space RES. The microprocessor of the mobile station includes a register for storing and evaluating the incoming binary values of each of the flags. These registers are illustrated schematically in FIG. 9 and are designated REG1, REG2, REG3 for the respective three flags R/N, R/F and B/I. Thus, in the present example, each of the three flags is represented by a three-bit word and the binary value of this word decides how the flag is interpreted.

Evaluation units V1, V2, V3 are each connected to a respective register and evaluate the incoming binary value of respective flags in an appropriate manner (see below), i.e. determine which of the two values in a flag is applicable. Conveniently, there is found a set of registers REG1–REG3 and associated evaluation units V1–V3 for each of the decoding diagrams 1, 5 and 6 according to FIGS. 7 and 8.

In its simplest form, each of the evaluation units V1–V3 is a simple comparator and deals with respective flags, by prescribing that any one of the first four three bit binary values 000, 001, 010, 011 constitutes the "R", "R" and "B" flags respectively, while any one of the four remaining three bit binary values 100, 101, 110, 111 constitutes the "N", "F" and "I" flags. The flag B/I is particularly sensitive to a wrong interpretation, i.e. if the flag is interpreted as "I" when "B" is meant to be sent, or vice versa. It is therefore convenient, in accordance with the following, to allow the first seven binary values 000, . . . , 110 to represent "B" and solely one binary value 111 to represent "I". Naturally, it is possible to insert a similar distribution of the binary values in the registers for the flags R/N and R/F. Thus, variable thresholds can be introduced when evaluating the different flags.

In the case of the decoding diagram 1 shown in FIGS. 7 and 8, which applies to the flags of the first message from the base station BS, the register REG3 for the B/I flag is constructed so that "B" will be given priority, since the wrong interpretation "I" instead of "B" would mean that the mobile station in the process of a message transmission (access) would be interrupted by an access attempt from another mobile station. From the aspect of hardware, this means that the first seven values 000, ..., 110 should be allowed to represent "B" and the value 111 should be allowed to represent "I", in accordance with the aforegoing.

In the case of diagrams 5 and 6, which apply to the steady-state progress, the B/I flag need not be afforded any particular priority. This means that the threshold is placed in the centre, i.e. as many binary values are reserved for "B" as those reserved for "I".

With regard to diagram 1, the same priority applies to flag R/F as that which applies to the flag B/I. No special priority is required for the flag R/N in the diagram 1.

The flags R/F and R/N need no special priority in respect of the diagrams 5 and 6.

What is claimed is:

1. A random access method in a time division multiple access mobile radio system, in which control channels and traffic channels are formed by time slots within a frame, and which includes a primary station and a plurality of secondary stations, each of which sends access messages in the form of short message words during time slots allocated by the primary station, comprising the steps of:
   sending from the primary station first flags, each first flag being associated with a respective time slot and denoting a state whether or not the respective associated time slot during which a secondary station shall transmit a message word to the primary station is idle or busy,
   initiating a communication by sending, from one of the secondary stations in response to a received first flag denoting an idle state, a first one of the message words in the time slot associated with the received first flag and sending, from the one of the secondary stations, subsequent ones of the message words in subsequent time slots associated with first flags that indicate to other secondary stations that the subsequent time slots are busy,
   sending from the primary station together with the first flags, second flags, each second flag indicating to the sending secondary station whether or not the primary station has received a respective one of the message words sent by the sending secondary station, and
   requesting retransmission of only one message word in an access message that has not been correctly received.

2. The method of claim 1, wherein after having received the first message word, the primary station again transmits a first flag which denotes that the associated time slot is allocated to the sending secondary station if the sending secondary station intends to transmit more message words, and together with the first flag transmits the second flag which acknowledges whether or not the first message word has been received by the primary station.

3. The method of claim 2, wherein when the primary station has not received the first message word, the second flag includes a request for the first message word to be retransmitted by the sending secondary station in the time slot allocated by the primary station according to the first flag.

4. A method according to claim 1, wherein the primary station, in addition to the first and second flags, transmits together with said flags, third flags to all secondary stations, each third flag indicating that an associated predetermined time slot is reserved for a predetermined secondary station for the purpose of sending a first one of the message words from the predetermined secondary station.

5. A method of detecting a flag in conjunction with random access in a time division multiple access mobile radio system, in which control channels and traffic channels are formed by time slots within a frame and which comprises a primary station and a plurality of secondary stations, each of which transmits access messages in the form of short message words during time slots allocated by the primary station, including the steps of:
   continually transmitting flags, each flag indicating a state whether an associated time slot, during which a secondary station shall transmit a message word to the primary station, is idle or busy, and
   transmitting from one of the secondary stations in response to a received flag transmitted by the primary station, a first one of the message words in the associated time slot indicated by the received flag as idle and transmitting succeeding ones of the message words in succeeding time slots that are indicated to other secondary stations as busy by the associated flags, and
   wherein each flag has one of a first plurality of binary values to indicate a first state of the associated time slot and one of a second plurality of binary values to indicate a second state of the associated time slot, and the first plurality of binary values is greater than the second plurality of binary values when the first state shall be given priority over the second state.

6. The method of claim 5, wherein said priority is given by the transmitting secondary station after the transmitting secondary station has transmitted the first one of the message words and has received a succeeding flag when the transmitting secondary station intends to send a further message word.

7. A method of detecting a flag in conjunction with random access in a time division multiple access mobile radio system, in which control channels and traffic channels are formed by time slots within a frame, and which includes a primary station and a plurality of secondary stations of which each transmits access messages in the form of short message words, each within a time slot which is allocated by the primary station, including the steps of:
   transmitting a succession of flags, wherein each flag has one of two states denoting whether an associated time slot, during which a secondary station shall transmit a message word to the primary station, has earlier been reserved or is free,
   transmitting, from one of the secondary stations in response to a flag transmitted from the primary station, the message word in the associated time slot that the primary station has indicated as reserved, and
   detecting the transmitted flag in the secondary station, and evaluating a binary value of the transmitted flag,
   wherein the transmitted flag has one of a plurality of binary values to indicate one state of the flag and a second plurality of binary values to indicate another state of the flag, and the number of the first plurality of binary values is greater than the number of the second plurality of binary values when the one state of the flag shall be given priority over the other state of the flag.

* * * * *